United States Patent

Asano

[11] 4,072,966
[45] Feb. 7, 1978

[54] PHOTOGRAPHIC CAMERA WITH BUILT-IN GENERATOR

[75] Inventor: Seiji Asano, Okegawa, Japan

[73] Assignee: Fuji Photo Optical Co., Ltd., Omiya, Japan

[21] Appl. No.: 679,373

[22] Filed: Apr. 22, 1976

[30] Foreign Application Priority Data

Apr. 24, 1975  Japan .................................. 50-50015

[51] Int. Cl.² ............................................. G03B 7/08
[52] U.S. Cl. .................... 354/60 R; 354/135
[58] Field of Search ................. 354/50, 51, 60 R, 234, 354/235, 135

[56] References Cited

U.S. PATENT DOCUMENTS

| | | |
|---|---|---|
| 3,598,030 | 8/1971 | Beach .................................. 354/60 R |
| 3,636,840 | 1/1972 | Harvey et al. ................. 354/60 R X |
| 3,703,132 | 11/1972 | Beach .......................... 354/60 R UX |

Primary Examiner—L. T. Hix
Assistant Examiner—M. L. Gellner

[57] ABSTRACT

A photographic camera having a built-in generator connected with an electric shutter control circuit in which the generator is rotated by an operating member to produce electricity to be supplied to said electric shutter control circuit in response to a shutter release operation. A switch is interposed between the generator and the exposure control circuit, and the switch is not closed until the operating member is moved by a predetermined distance to rotate the generator for a time longer than the rising time of the output current of the generator so that only a stable current is supplied to the exposure control circuit from the generator.

13 Claims, 7 Drawing Figures

4,072,966

PHOTOGRAPHIC CAMERA WITH BUILT-IN GENERATOR

BACKGROUND OF THE INVENTION

1. Field of the Invention

This invention relates to a photographic camera having a built-in generator, and more particularly to a photographic camera provided with an electric shutter which is controlled by an electric control circuit supplied with electric power from an electric generator provided in the camera.

2. Description of the Prior Art

It has been known in the art to provide an electric generator in a camera for creating electricity upon release of a shutter release mechanism for supplying electric power to an electric shutter control circuit. In this kind of camera, an acting member engaged with the generator is moved overcoming the force of a strong spring upon film wind-up operaiton and the acting member is released to rotate the generator by the force of the spring to create electricity upon release of the shutter.

This kind of camera having a built-in generator suffers from a defect in that the electric power generated from the generator is not stable but is in proportion to the revolution speed of the generator. Therefore, when the generator starts to be driven, the electric power output has a rising characteristic. Accordingly, there is a fear that the shutter control circuit be supplied with unstable current and incorrectly operate. Further, when it is desired to open a shutter for a long time, the generator must keep on rotating for a long time until the shutter it to be closed. This requires a special means for keeping the generator rotated and preventing the shutter control circuit from being supplied with the rising power output.

Further, if this kind of camera having a built-in generator is provided with a slow shutter speed warning means which works to lock a shutter mechanism when the controlled shutter speed is too slow to obtain a sharp photograph, it sometimes happens that the generator is discharged without releasing a shutter to prevent the too slow speed shutter release. In such a case, it is required that the generator should be charged without winding up the film.

SUMMARY OF THE INVENTION

The primary object of the present invention is to provide a photographic camera with a generator in which the unstable output of the generator is prevented from being supplied to a shutter control circuit.

Another object of the present invention is to provide a photographic camera with a generator in which a long time exposure can be obtained by keeping the generator rotated for a long period.

Still another object of the present invention is to provide a photographic camera with a generator in which is provided a slow shutter warning means which locks the shutter mechanism when the controlled shutter speed is too slow to take a sharp picture.

A further object of the present invention is to provide a photographic camera with a generator which is able to prevent a double exposure.

A still further object of the present invention is to provide a photographic camera with a generator which is able to obtain a double exposure.

A still another object of the present invention is to provide a photographic camera with a generator which is provided with a slow shutter warning means and further with means to nullify the slow shutter warning means when the camera is stably supported on a tripod or the like.

The photographic camera having a built-in generator in accordance with the present invention is characterized in that an operating member which is charged upon film wind-up operation and released to drive a generator upon shutter release operation is provided with a cam portion which prevents a shutter control circuit from being turned on until the speed of drive i.e. rotation of the generator reaches a stable level. The cam portion of the operating member is engaged with a shutter driving member which is related with various switches for controlling a shutter control circuit so that the shutter control circuit may not be turned on until the operating member moves by a predetermined length. Further, the shutter driving member is related with a locking means which locks the shutter driving member when the controlled shutter speed is too slow to obtain a sharp photograph. The locking means is associated with a lock nullifying means which is manually operated to nullify the locking means when the camera is stably supported on a tripod or the like.

DESCRIPTION OF THE PREFERRED EMBODIMENTS

Figure 1:
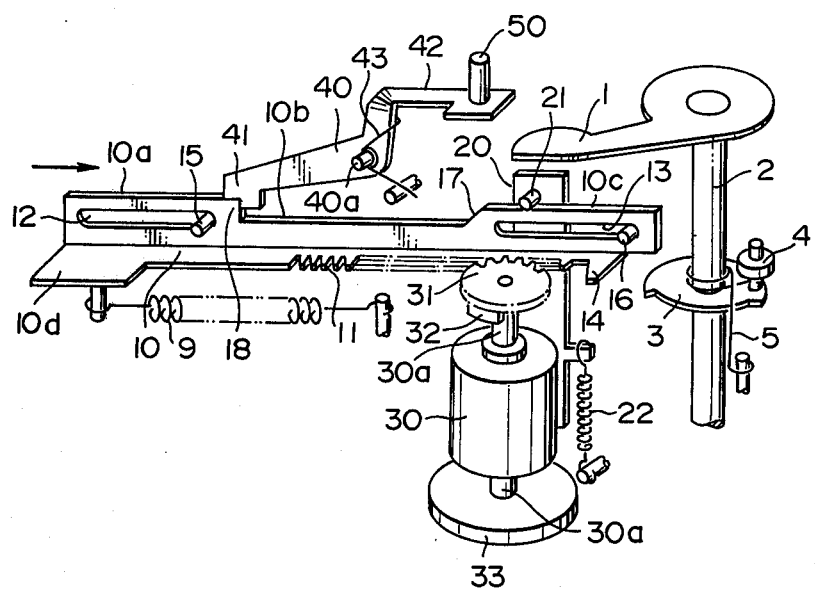
FIG. 1 is a perspective view of an embodiment of the mechanism related with a generator provided in the camera in accordance with the present invention.

FIG. 1 shows an embodiment of the present invention in which a generator 30 is driven by an operating member 10 upon release of a shutter. The mechanism shown in FIG. 1 is in a state wherein the shutter is charged. An operating member 10 having an L-shaped cross-section which is spring urged to the right in the drawing by a tension spring 9 is slidably guided by means of guide pins 15 and 16 and slots 12 and 13 engaged therewith. The operating member 10 has a cam surface on the upper edge thereof comprising a first flat cam 10a, a second flat cam 10b having a lower level than the first, and a third flat cam 10c having a higher level than the second. The second and third cams 10b and 10c are connected with each other by way of a slanted face 17. The first and second cams 10a and 10b are connected with each other way of a step portion 18 which is to be engaged with an engaging portion 41 of a shutter lever 40. The shutter lever 40 is pivotally provided in the camera and spring urged by a spring 43 in the counterclockwise direction to be engaged at said engaging portion 41 with the step 18 of the operating member 10. The shutter lever 40 further has an arm 42 on the side opposite to said engaging portion 41 with respect to the pivot 40a thereof which arm 42 is provided with a shutter release button 50 fixed thereto. By depressing the shutter release button 50, the shutter lever 40 is rotated clockwise and the engaging portion 41 is disengaged from the step 18 of the operating member 10 to allow the same to move to the right. The third cam 10c is engaged with a follower 21 of a shutter driving member 20 which is spring urged downward by means of a tension spring 22 when the operating member 10 is in the charged position as shown in FIG. 1. The details of the shutter driving member 20 will be described hereinafter.

Figure 2:
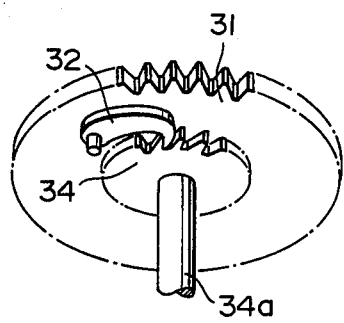
FIG. 2 is a fragmentary perspective view showing a ratchet means provided on a generator driving wheel employed in the mechanism as shown in FIG. 1.

The operating member 10 has teeth 11 and projection 14 on one side of a horizontally extending portion 10d thereof. The teeth 11 are engaged with a gear 31 which is mounted to a drive shaft 30a of a generator 30 by way of a ratchet claw 32 as shown in FIG. 2. The drive shaft 30a is further provided with a flywheel 33 fixed thereto to increase the inertia thereof. The projection 14 of the operating member 10 is brought into engagement with a roller 4 mounted on a shutter charge portion 3 of a film wind-up shaft 2 which is rotated by a wind-up lever 1. The wind-up lever 1 is spring urged in the clockwise direction by a spring 5. When the wind-up lever 1 is rotated counterclockwise overcoming the force of the spring 5, the roller 4 mounted on the charge portion 3 thereof is brought into engagement with and pushes leftward the projection 14 of the operating member 10. Thus, the operating member 10 is moved to the left and put into the charged position as shown in FIG. 1 by the rotation of the film wind-up 2.

Referring to FIG. 2, the gear 31 is engaged with a ratchet wheel 34 by way of a ratchet claw 32 so that only the clockwise rotation of the gear 31 is transmitted to the ratchet wheel 34. The ratchet wheel 34 is fixed to the drive shaft 30a of the generator 30 and is engaged with the ratchet claw 32 only when the gear 31 is rotated clockwise.

Figure 3:
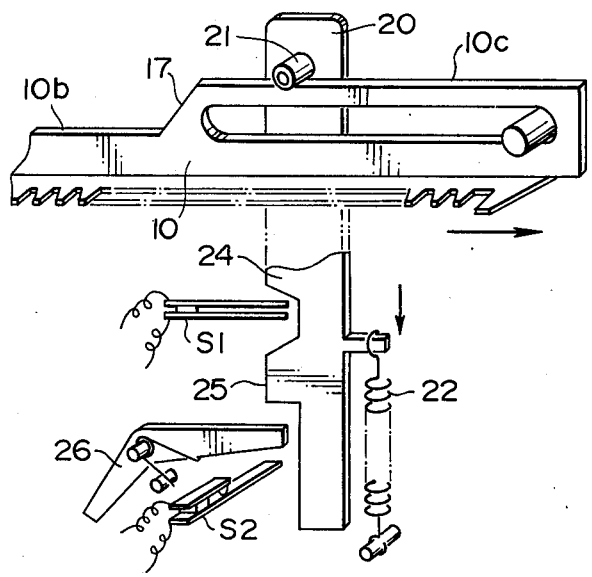
FIG. 3 is a fragmentary perspective view showing a shutter driving member employed in the mechanism as shown in FIG. 1.
Figure 4:
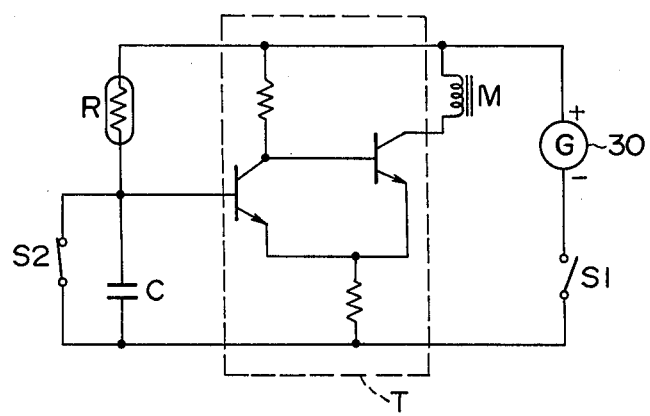
FIG. 4 is a circuit view showing an example of a shutter control circuit operated by said shutter driving member.

Referring to FIG. 3, said shutter driving member 20 has two step portions 24 and 25 which are to be engaged with a first switch S1 for connecting the generator 30 to a shutter control circuit as shown in FIG. 4, a shutter release lever 26 for releasing a mechanical engagement of a shutter, and a second switch S2 for starting the measurement of the scene brightness. As the shutter driving member 20 is moved downward, the first switch S1 is first closed to connect the generator 30 to the shutter control circuit to supply the electricity generated thereby to the circuit. Then, the shutter release lever 26 is rotated clockwise to start the shutter, and thereafter the second switch S2 is opened to start measurement of the scene brightness.

As shown in FIG. 4, the shutter control circuit comprises a photoreceptor R to measure the scene brightness, a capacitor C connected in series therewith, said second switch S2 connected in parallel with said capacitor C, an exposure time terminating transistor circuit T connected with the photoreceptor R and the capacitor C, an electromagnet M connected with the circuit T which is deenergized by the transistor circuit T to close the shutter when the time for exposure has lapsed, said generator 30 connected with the circuit T and with said photo-receptor R and the capacitor C for supplying a current thereto, and said first switch S1 connected in series with said generator 30.

In operation of the embodiment as described above and shown in FIGS. 1 to 4, the generator 30 is not connected with the shutter control circuit in the initial stage of the movement of the operating member 10 since the cam follower 21 fixed to the shutter driving member 20 is in the higher level engaged with the third cam 10c and the first switch S1 is not closed until the operating member 20 moves by a predetermined distance. Therefore, the unstable initial output current of the generator 30 is not supplied to the shutter control circuit. The output current of the generator 30 is supplied to the circuit only after the current becomes stable. Further, the shutter release means and the exposure time determining means including the capacitor C are not operated until the stable current is supplied to the circuit since the shutter release lever 26 and the second switch S2 are not operated until the shutter driving member 20 is moved downward.

The above described embodiment of the present invention is advantageous in that the unstable initial current output of the generator 30 is not supplied to the shutter control circuit. Further, since the generator 30 is provided with a ratchet wheel 34 so that the generator 30 is rotated only in the direction to produce electricity, it is prevented from being rotated in the reverse direction to result a counter electromotive force, which results in shortening of the life of the generator 30. In addition, since the generator 30 is provided with a flywheel 33, it is possible to keep on rotating the generator 33 even after the operating member 20 has stopped, thereby to obtain a long exposure time. Furthermore, since only one member is operated by the shutter driving member 20 to release a shutter mechanism, the shutter release operation can easily be made with a light touch and accordingly the image blur can be prevented.

Figure 5:
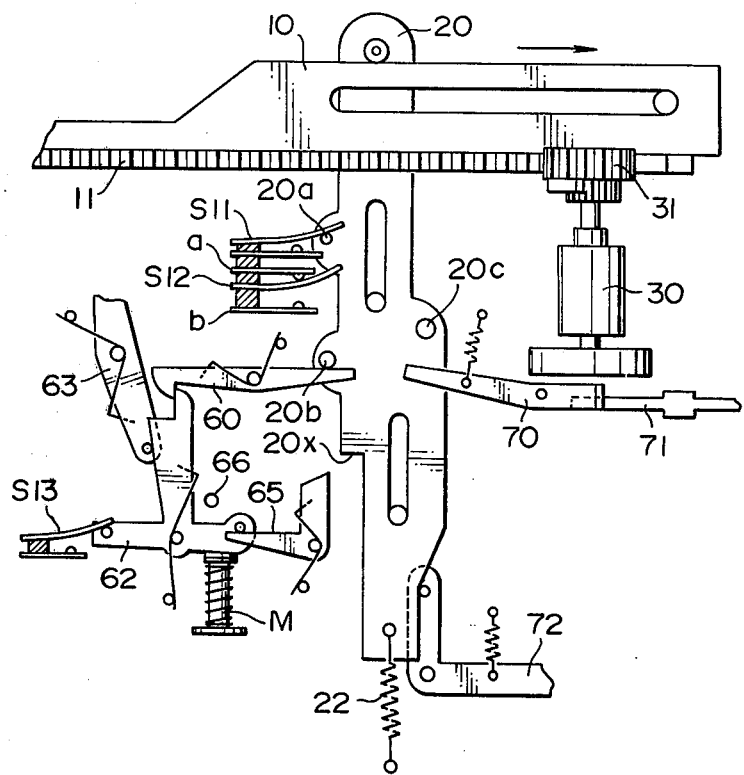
FIG. 5 is a perspective view of another embodiment of the mechanism related with a generator provided in the camera in accordance with the present invention.

A second embodiment of the camera in accordance with the present invention will now be described with reference to FIGS. 5 to 7. FIG. 5 illustrates a mechanism related to a generator 30 and a shutter driving member 20, wherein those elements which are equivalent to those employed in the first embodiment shown in FIGS. 1 to 3 are designated with the same reference numerals. The mechanism as shown in FIG. 5 is connected with a shutter control circuit as shown in FIG. 6.

Figure 6:
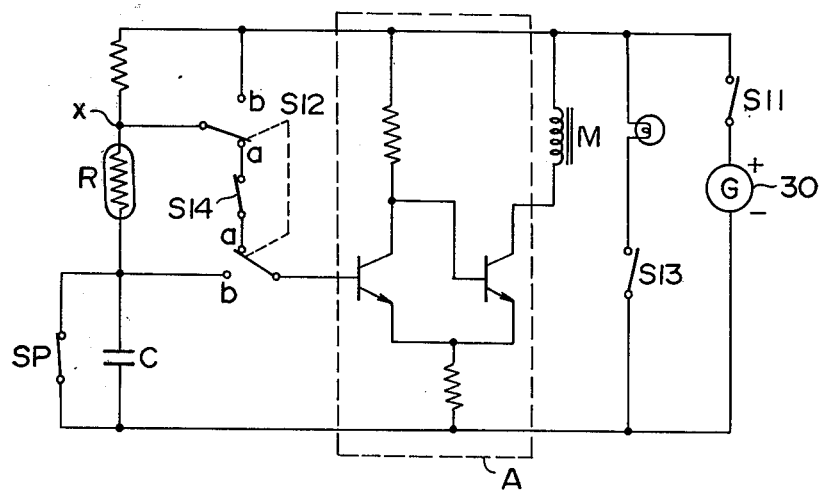
FIG. 6 is a circuit view of an example of a shutter control circuit connected with the mechanism as shown in FIG. 5.

Referring to FIGS. 5 and 6, as the shutter driving member 20 is moved downward, a pin 20a engaged with a first switch S11 closes the same to connect a generator 30 to the shutter control circuit and then the potential at a point x between a photoreceptor R and a resistor r is transmitted to a detecting portion A by way of the contact a of the second switch S12 and a contact a of the fourth switch S14. Then, simultaneously with the closure of the first switch S11, a pin 20b rotates an engaging lever 60 clockwise to disengage the same from a T-shaped lever 62. The T-shaped lever 62 is engaged with a shutter closing lever 63 to rotate the same clockwise when it is rotated counterclockwise. The counterclockwise rotation of the T-shaped lever 62 is controlled by an electro-magnet M which is energized when the scene brightness is sufficiently high. The electromagnet M is deenergized when a time for exposure has lapsed. As shown in FIG. 6, the electromagnet M is controlled by said detecting circuit A which operates to energize the electromagnet M only when the potential at the point *x* higher than a predetermined level. When the potential at the point *x* is lower than the predetermined level, the electromagnet M is not energized, and accordingly, the T-shaped lever 62 is rotated counterclockwise upon disengagement of said engaging lever 60 from the lever 62. The T-shaped lever 62 is engaged with a locking lever 65 which is brought into a locking position to lock the shutter driving member 20 by the counterclockwise rotation of the T-shaped lever 62. When the T-shaped lever 62 is rotated counterclockwise, a third switch S13 is closed to turn on a warning lamp L to indicate that the controlled shutter speed to too slow to take a sharp picture.

By further moving the shutter driving member 20 downward, the second switch S12 is changed over from the contact *a* to *b* to form a conventionally well known shutter speed control circuit to energize the electromagnet M for the period of exposure time. A switch Sp connected in parallel with a capacitor C connected in series with said photoreceptor R is opened at the same time as a shutter starting mechanism is operated to start the exposure by means of a mechanical shutter starting means (not shown) connected with the shutter driving member 20. When the time for exposure has lapsed, the electromagnet M is deenergized and the exposure is terminated by allowing the T-shaped lever 62 to rotate counterclockwise and rotating the shutter closing lever 63 clockwise.

When the scene brightness is below a predetermined level as mentioned hereinbefore, the electromagnet M is not energized and accordingly the T-shaped lever 62 is rotated counterclockwise and the locking lever 65 is rotated clockwise into a locking position to lock the shutter driving member 20 at a step portion 20x thereof before the shutter driving member 20 comes down to the position to change the second switch S12 over from the contact *a* to the contact *b*. At the same time, the shutter closing lever 63 is also rotated clockwise. However, since the shutter is not opened, the rotation of the shutter closing lever 63 does not effect on the shutter operation at all. As described hereinbefore, the warning lamp L is turned on by closure of the third switch S13 upon counterclockwise rotation of the T-shaped lever 62. If the camera is stably supported on a tripod or the like and it is desired to take a picture with a slow shutter speed, the fourth switch S14 is manually opened to form a circuit to energize the electromagnet M.

Now, even in case that the shutter driving member 20 is locked in the upper position to prevent the photographing operation with a slow shutter speed, it sometimes happens that the operating member 10 is moved to the right. In this case, a shutter charging operation is required to move the operating member 10 back to its charged position for the subsequent shutter release. In this case, since the film in the camera is not exposed, it is not necessary to wind the film up. Therefore, it is required to charge only the operating member 10 and the shutter driving member 20. This charging operation is desired to be conducted by a simple operation to rotate the wind-up lever 1.

Figure 7:
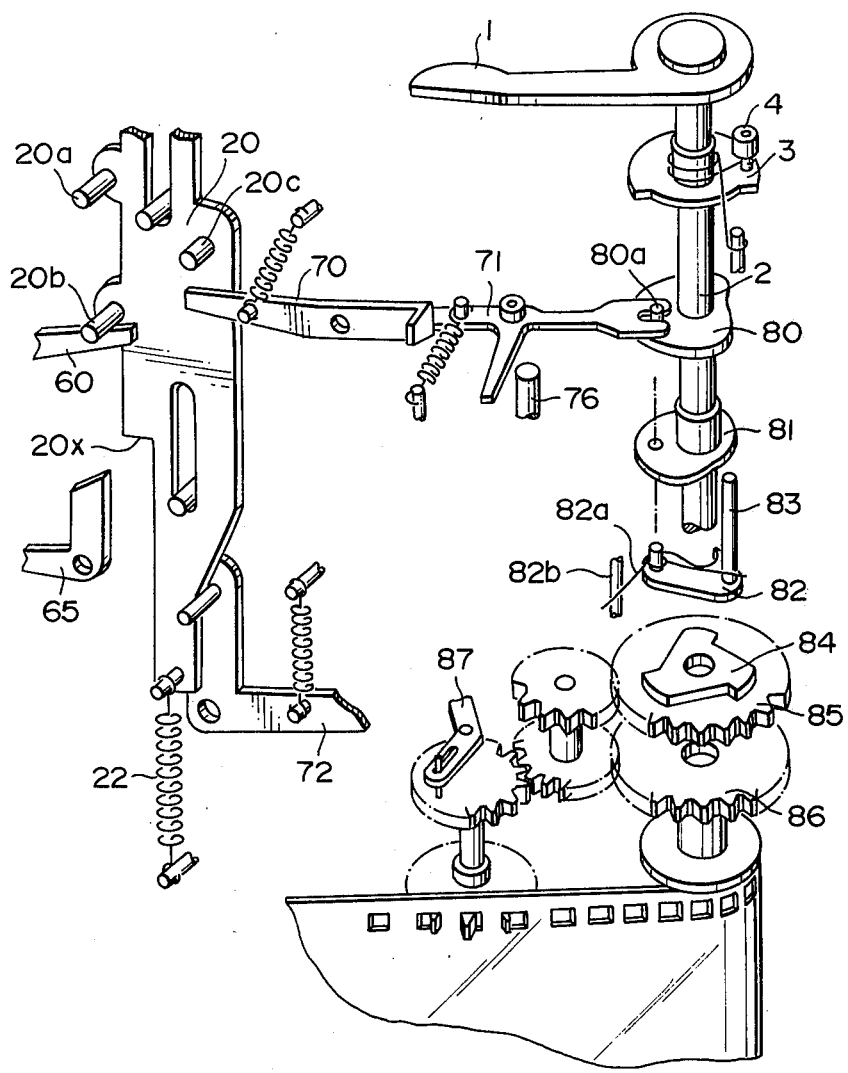
FIG. 7 is a perspective view showing a mechanism concerned with a film wind-up means and a shutter driving means associated with the mechanism as shown in FIG. 5.

FIG. 7 shows a mechanism for conducting the above described charging operation. A film wind-up shaft 2 has a cam 80 rotatably mounted thereon and engaged with an end of an intermediate lever 71 by way of a pin 80*a* fixed to the cam 80. The intermediate lever 71 is engaged with a connecting lever 70 which is spring urged in the clockwise direction and rotated counterclockwise by a pin 20*c* fixed to the shutter driving member 20 when the shutter driving member 20 moves downward. By the counterclockwise rotation of the connecting lever 70, the intermediate lever 71 is set free to rotate counterclockwise to rotate the cam 80 clockwise. When the scene brightness is sufficiently high, the cam 80 is thus rotated clockwise. The cam 80 is engaged with a follower pin 83 which is mounted to a clutch claw 82 which in turn is pivotally mounted to a support plate 81 that is fixed to the film wind-up shaft 2. By the clockwise rotation of the cam 80, a small radius part of the cam 80 is brought into engagement with the follower pin 83 and the clutch claw 82 carrying the follower pin 83 is rotated counterclockwise. The follower pin 83 is spring urged to follow the cam surface of the cam 80 by a spring 82*a* one end of which is engaged with a stationary pin 82*b* fixed to the support plate 81. Thus, the clutch claw 82 is rotated counterclockwise and falls into engagement with a clutch gear 84 fixed to an interconnecting gear 85 so that the rotation of the film wind-up shaft 2 is transmitted to a film wind-up gear 86. The rotation of the film wind-up gear 86 is transmitted to a film counter feed lever 87 to rotate a film counter (not shown).

The operation of the above mechanism in case that the operating member 10 is released without moving the shutter driving member 20 will now be described with reference to FIG. 7. When the scene brightness is below a predetermined level, the locking lever 65 is moved to the locking position and prevents the downward movement of the shutter driving member 20. Therefore, the connecting lever 70 is not rotated counterclockwise. Accordingly, said cam 80 is not rotated and said clutch claw 82 is not put into engagement with the clutch gear 84. Therefore, the rotation of the film wind-up shaft 2 is not transmitted to said film wind-up gear 86 and the counter feed lever 87 is not rotated either. However, since the shutter charge portion 3 of the film wind-up shaft 2 is rotated, the roller 4 mounted thereon pushes said operating member 20 backward to its initial position and accordingly moves said shutter driving member 20 upward to its original position as shown in FIG. 5. As mentioned hereinbefore, the operating member 10 is engaged with the shutter lever 40 when it is moved back to its left position. Thus, the shutter is charged and the operating member 10 to drive the generator 30 is moved to its charged position. Simultaneously, a set pin 66 shown in FIG. 5 rotates the T-shaped lever 62 clockwise up to the position engaged with the engaging lever 60. A set pin 76 shown in FIG. 7 also works to set the intermediate lever 71 to its initial position upon charging operation of the mechanism. The set pins 66 and 76 are moved back to the retracted position before the levers 62 and 71 are rotated counterclockwise. It is possible to conduct a double exposure by manually operating the set pin 76 to move the intermediate lever 71 to its initial position without winding the film.

A wind stop release lever 72 shown in FIGS. 5 and 7 operates to stop and release the film wind-up shaft 2 to prevent double wind-up of the film.

I claim:

1. A photographic camera comprising a built-in generator, an electric shutter control circuit connected with said generator, an operating member for rotating said generator to produce electricity to be supplied to said electric shutter control circuit in response to a shutter release operation, a power switch interposed between said generator and said exposure control circuit for energizing the control circuit when it is in the closed position, and means operatively connected with said operating member for closing said switch only when the operating member is moved by a predetermined distance to rotate the generator for a time longer than the rising time of the output current of the generator, whereby only a stable current is supplied to the exposure control circuit from the generator.

2. A photographic camera as defined in claim 1, comprising a shutter driving member, and wherein said switch is closed by said shutter driving member which is engaged with said operating member and moved to close said switch only after the operating member has moved by a predetermined distance.

3. A photographic camera as defined in claim 2 wherein said operating member has a cam surface and said shutter driving member has a cam follower pin engaged therewith, and said shutter driving member is spring urged to have the follower pin follow the cam surface of the operating member so that the shutter driving member is moved to close said switch when the cam surface of the operating member engaged with the follower pin is changed from one portion to another thereof.

4. A photographic camera as defined in claim 2 wherein a locking means is provided for preventing the movement of said shutter driving member when a shutter speed controlled by said electric exposure control circuit is too slow to obtain a sharp photograph.

5. A photographic camera as defined in claim 4 wherein said locking means is engaged with a lever which is moved between a first position to hold the locking means in the retracted position and a second position to allow the locking means to lock said shutter driving member, said lever being held in said first position by means of an electromagnet which is energized when the scene brightness is higher than a predetermined level.

6. A photographic camera as defined in claim 5 wherein said electromagnet is deenergized when the scene brightness is lower than the predetermined level, whereby said lever is moved to said second position to lock the shutter driving member and prevent the release of the shutter.

7. A photographic camera as defined in claim 1 wherein a clutch means is interposed between said operating member and said generator so that the generator is rotated to produce electricity only when the operating member is moved in the direction to close said switch.

8. A photographic camera as defined in claim 7 wherein said generator is provided with a flywheel to increase the inertia thereof, thereby obtaining a long time exposure by keeping on rotating the generator even after said operating member has stopped its movement.

9. A photographic camera as defined in claim 1 wherein said operating member is moved in one direction in response to a film wind-up operation and is moved in the opposite direction to rotate said generator in response to a shutter release operation.

10. A photographic camera as defined in claim 9, comprising a film wind-up mechanism, a film wind-up lever, a clutch means connecting said film wind-up lever to said film wind-up mechanism, and wherein said operating member is associated with the film wind-up lever, whereby it is made possible to move the operating member in said one direction without winding up a film.

11. A photographic camera as defined in claim 10 wherein a means for operating said clutch means is provided.

12. A photographic camera as defined in claim 11, comprising a shutter driving member, and means interconnecting said shutter driving member and said operating member, and wherein said means for operating said clutch means is connected with said shutter driving member, which is moved in a shutter releasing direction by the movement of said operating member, by way of said interconnecting means.

13. A photographic camera as defined in claim 12 wherein said interconnecting means is provided with a manually operable set pin for operating said clutch means manually independently of the release of the shutter.

* * * * *